May 17, 1955     T. F. NEWTON     2,708,335
LAWN EDGER AND TRIMMER
Filed Jan. 22, 1954
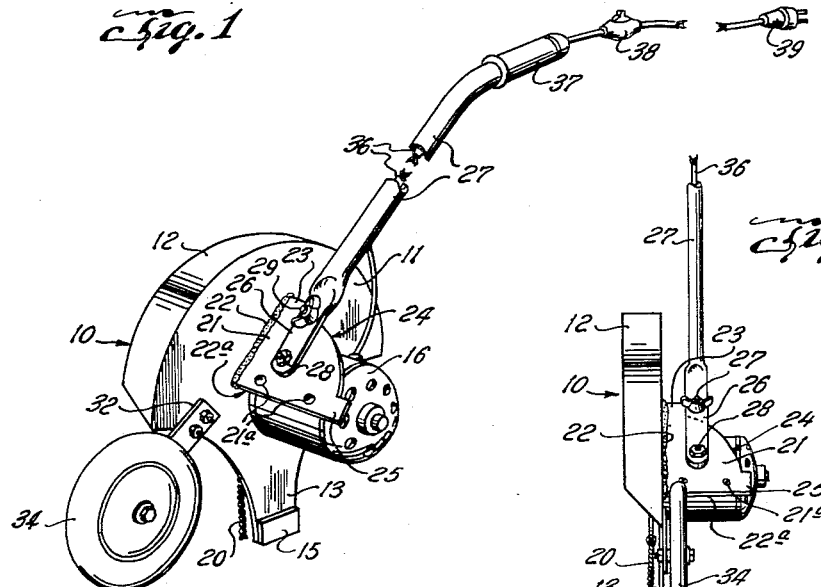
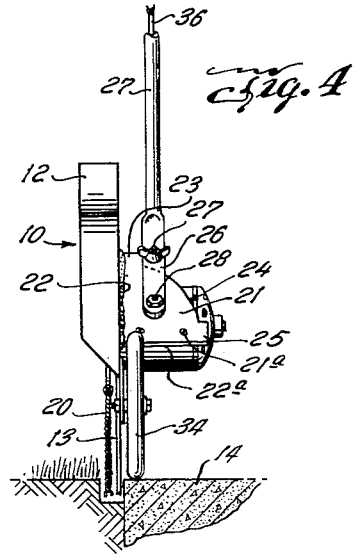
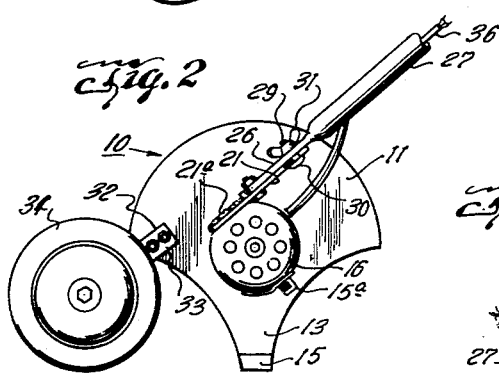
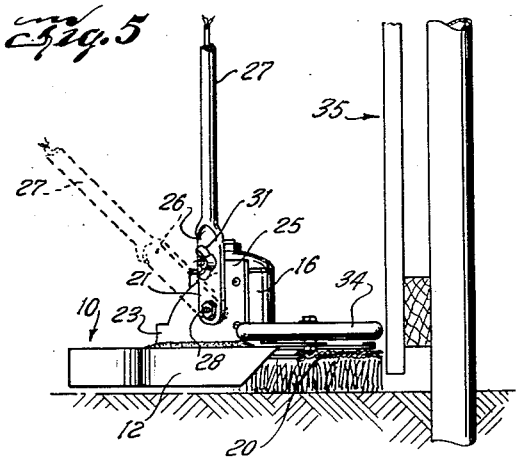
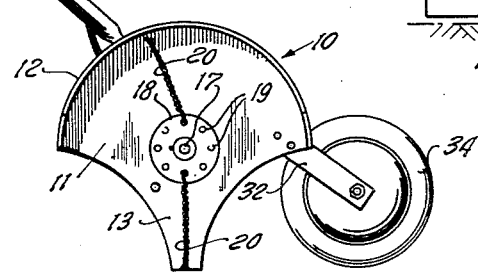
Thomas F. Newton
INVENTOR.
ATTORNEY

United States Patent Office 2,708,335
Patented May 17, 1955

2,708,335

LAWN EDGER AND TRIMMER

Thomas F. Newton, Dallas, Tex.

Application January 22, 1954, Serial No. 405,619

2 Claims. (Cl. 56—25.4)

This invention relates to grass and weed cutting machines and it has particular reference to an electrically operated, lawn edging and trimming device.

The principal object of the invention is to provide a lawn edging and trimming machine whose design and construction is such that it will not onl ytrim grass along the edges of walks, curbs, drives and the like but also will cut grass and weeds growing below overhanging shrubbery, and in close adjacency to fences and in other places inaccessible to conventional edging and trimming machines.

Another object of the invention is to provide a lawn edging and trimming machine whose construction involves but a minimum number of parts, making for economy of manufacture, said parts consisting of a motor mounting plate having an integral arcuated guard flange and an edging guide, a supporting wheel, a motor, a cutter, a handle and a quadrant to which the handle is pivoted so that the handle may be adjusted to any selected angle between a position parallel with the operative plane of the cutter and a position at right angles to said plane.

Still another object of the invention is to provide a cutter consisting of a disc mounted on the motor shaft having a plurality of annularly spaced holes adjacent its periphery and in two diametrically opposite holes is mounted a cutting blade consisting of a length of wire of harder material than that of the disc, and which is bent upon itself and twisted to swing loosely from the disc so that rapid rotation of the latter will bring the wire blades into violent engagement with the grass to sever the same as the machine is advanced and due to the flexibility of the wire blades, they are not easily damaged by being brought into engagement with hard surfaces such as concrete walks, curbing, rocks and the like.

Other objects will become manifest as the description proceeds when considered with the annexed drawing wherein:

Figure 1 is a fragmentary front perspective view of a lawn edger and trimmer constructed according to the invention.

Figure 2 is a fragmentary side elevational view there-of.

Figure 3 is a fragmentary elevational view of the side of the machine opposite that shown in Figure 2.

Figure 4 is a fragmentary front elevational view, and

Figure 5 is a fragmentary elevational view of the machine adjusted to operate on a horizontal plane.

Continuing with a more detailed description of the drawing, reference numeral 10 denotes generally the frame or body of the machine which consists of a flat plate 11, on the upper half of which is formed an arcuate flange 12. The lower portion of the plate 11 is cut away on opposite sides to define a guide 13 whose function is shown in Figure 4, that is, providing a guide for the edging machine by engaging the edge of a sidewalk 14. A tip or wear plate 15 of extra hard metal is welded to the lower end of the guide 13 to reduce wear thereon.

Secured by means of a bracket 15a to the face of the plate 11 opposite the flange 12 is a motor 16 whose shaft 17 extends through the plate 11 and carries a disc 18 having therein a series of annularly spaced holes 19 adjacent its perimeter. The cutting elements or blades 20 are each formed by extending a length of wire through a selected one of the holes 19, bending the wire onto itself and twisting the parallel portions of the wire together, leaving a loop of sufficient diameter to enable the wire blade to swing loosely from the disc 18. In like manner, a second blade is mounted in a diametrically opposed hole 19 in the disc and the ends of the twisted wires are cut to a length enabling their free ends to clear the arcuated guard 12 when the motor 16 is in operation As the holes 19 in in he disc 18 become worn, the wire cutting blades 20 may be suspended in other selected holes of the disc.

A flat metal plate 21 in the shape of a quadrant is welded along one edge at 22 to the outer surface of the motor mounting plate 11 and is disposed in a plane at right angles to the plate. The motor 16 is secured by means of screws 21a to the edge 22a of the plate 21, which is at right angles to its welded edge 22. Adjacent its welded edge, the quadrant 21 has a projection 23 which extends beyond the arcuated edge 24 thereof and like projection 25 separated 90° from the projection 23. These projections form stops for limiting the travel of a flattened portion 26 of a handle 27, which is pivoted by means of a bolt 28 to the quadrant 21. Extending through the flattened portion 26 is a bolt 29 having a large head 30 (Figure 2), one edge of which engages under the arcuated edge 24 of the quadrant 21. A wing nut 31 is threaded onto the bolt and bears against the outer face of the flattened portion 26 of the handle. By loosening the nut 31, the handle 27 may be moved to any angular position between a position parallel with the motor mounting plate 11 and a position perpendicular thereto, the latter position being shown in Figure 5.

Mounted on a bracket 32, which is secured to the mounting plate 21 by bolts 33, is a wheel 34. This wheel supports the edger by rolling along the edge of the side walk 14 but in cases where the device is used for trimming hedges or along fence lines, the wheel is inactive. Such an example is shown in Figure 5 in which a fence is indicated by reference numeral 35.

To supply current to the motor 16, insulated wires 36 extend downwardly through the curved hand grip 37 and the tubular handle 27 and emerge through an opening in the latter adjacent its lower end where they are connected to the motor. A control switch 38 is incorporated in the lead-in wires 36 and a suitable electrical coupling 39 is provided on the ends of the wires by which connection may be made to a house circuit.

The foregoing description incorporates an explanation of operation of the machine and its various functions are clearly shown in the drawing, hence a separate explanation of the operation of the invention is deemed unnecessary.

Manifestly, the construction as shown and described is capable of some modification and such modification as may be construed to fall within the scope and meaning of the appended claims is also considered to be within the spirit and intent of the invention.

What is claimed is:

1. A lawn edging and trimming device comprising a motor mounting plate having an arcuate portion and a guide diametrically opposing said arcuate portion, a guard flange on and coextensive with said arcuate portion, a supporting wheel mounted on the front of said plate, a motor secured to said motor mounting plate and having a shaft extending through said motor mounting plate a handle mounting plate defining a quadrant disposed perpendicular to said motor mounting plate and having right angular edges and an arcuate edge, one of said right angular edges being affixed to said motor mounting plate, the other edge of said quadrant being secured to said motor to dispose the plane of said quadrant tangent to said motor, grass cutting means carried by said shaft, a handle having one end pivoted to said quadrant, a bolt extending through said handle having a head engaging the underside of the arcuated edge of said quadrant to clampingly hold said handle in adjusted angular positions in relation to said motor mounting, and stop means on said quadrant limiting the oscillative displacement of said handle to a position perpendicular to said motor mounting plate.

2. A lawn edging and trimming device comprising a motor mounting plate having an arcuate portion and a guide diametrically opposing said arcuate portion, a guard flange on and coextensive with said arcuate portion, a supporting wheel mounted on the front of said plate, a motor secured to said motor mounting plate and having a shaft extending through said motor mounting plate, a handle mounting plate defining a quadrant disposed perpendicular to said motor mounting plate and in a plane tangent to said motor and having right angular edges and an arcuate edge, one of said right angular edges being affixed to said motor mounting plate, grass cutting means carried by said shaft, comprising a disc on said motor shaft having a series of angularly spaced apertures therein adjacent its perimeter and a pair of twisted wires each defining a loop at one end, the loops of said wires engaging in diametrically opposed apertures in said disc, a handle having one end pivoted to said quadrant, and means carried by said handle and clampingly engaging the arcuate edge of said quadrant to hold said handle in adjusted angular positions in relation to said motor mounting plate.

References Cited in the file of this patent
UNITED STATES PATENTS

| | | |
|---|---|---|
| D. 172,275 | Gabbert et al. | May 25, 1954 |
| 2,538,230 | Boggs | Jan. 16, 1951 |
| 2,612,741 | McKay | Oct. 7, 1952 |
| 2,653,391 | Rooke | Sept. 29, 1953 |
| 2,672,002 | Nelson | Mar. 16, 1954 |